United States Patent [19]

Thompson et al.

[11] Patent Number: 4,964,900
[45] Date of Patent: Oct. 23, 1990

[54] RESPIRATOR FILTER MEANS FOR REMOVAL OF TRITIATED WATER

[75] Inventors: Ronald E. Thompson, North Huntingdon; William P. King, Washington, both of Pa.

[73] Assignee: Mine Safety Appliances Company, Pittsburgh, Pa.

[21] Appl. No.: 301,664

[22] Filed: Jan. 25, 1989

[51] Int. Cl.[5] .................... G21F 9/12; G21F 9/02; B01D 59/00; B01D 39/00

[52] U.S. Cl. ............................ 55/387; 128/205.27; 128/206.17; 128/205.12; 55/DIG. 35; 210/682; 210/688; 210/694; 376/313; 376/314

[58] Field of Search ................ 128/201.25, 205.12, 128/205.27, 205.29, 206.12, 206.15, 206.16, 206.17; 55/DIG. 9, DIG. 33, DIG. 35, 389, 387; 210/681, 682, 688, 694; 376/313, 314

[56] References Cited

U.S. PATENT DOCUMENTS

| | | | |
|---|---|---|---|
| 703,948 | 7/1902 | Muntz | 128/201.25 |
| 1,787,875 | 1/1931 | Perrott et al. | 55/DIG. 33 |
| 1,789,262 | 1/1931 | Monro et al. | 128/206.17 |
| 2,227,959 | 1/1941 | Cover | 128/206.17 |
| 2,752,309 | 6/1956 | Emmons et al. | 210/682 |
| 3,101,998 | 8/1963 | Milliken, Jr. et al. | 210/682 |
| 3,505,017 | 4/1970 | Roth | 376/313 |
| 3,944,403 | 3/1976 | Simpson et al. | 55/DIG. 35 |
| 3,963,826 | 6/1976 | Anderson et al. | 376/314 |
| 3,986,835 | 10/1976 | Takagi | 55/DIG. 9 |
| 3,993,542 | 11/1976 | Blum et al. | 376/314 |
| 4,010,100 | 3/1977 | Suslick | 55/67 |
| 4,131,544 | 12/1978 | Elaki | 55/387 |
| 4,154,235 | 5/1979 | Warncke | 128/201.25 |
| 4,178,350 | 12/1979 | Collins et al. | 376/313 |
| 4,447,353 | 5/1984 | Pence et al. | 55/66 |
| 4,500,328 | 2/1985 | Brassell et al. | 55/DIG. 9 |
| 4,702,903 | 10/1987 | Keefer | 55/28 |
| 4,714,486 | 12/1987 | Silverthorn | 55/DIG. 35 |
| 4,754,751 | 7/1988 | Mausteller et al. | 128/201.25 |
| 4,780,113 | 10/1988 | Koslow | 55/20 |
| 4,816,237 | 3/1989 | Ionomura et al. | 55/26 |

OTHER PUBLICATIONS

*The Universal and the Fireman's Gas Masks*, Technical Paper #300, Katz et al., Published by 'The Department of the Interior', 5/23/1923, pp. 1-22.

Primary Examiner—Edgar S. Burr
Assistant Examiner—Kimberly L. Asher
Attorney, Agent, or Firm—Reed Smith Shaw & McClay

[57] ABSTRACT

A filter for a respirator for removal of tritiated water having a housing with fluid inlet and output ports. A filter chamber is interposed between and in communication with the inlet and outlet for containing the tritium filter medium. A tritium filter media is selected from a particulate activated carbon or a particulate silica gel in which the media has a moisture content of from about 25% to 40% by weight of the media and a particulate distribution size range of from 6×20 to 12×30.

3 Claims, 2 Drawing Sheets

RESPIRATOR FILTER MEANS FOR REMOVAL OF TRITIATED WATER

FIELD OF THE INVENTION

The invention relates to a canister or cartridge means and filter material for use in a respirator for filtering tritiated water from a gas.

BACKGROUND OF THE INVENTION

Filtering means for use with respirators in removing hazardous material from the atmosphere are well known. Also, it is known to use an air purifying respirator to remove tritiated water vapor from the atmosphere.

Presently, the exchange of higher hydrogen isotopes is achieved by using vermiculite exchange beds. These beds are contained in canisters which attach to a respirator face mask through a hose. Prior to use, the exchange bed must be wetted by adding water to the canister. While these beds function to remove tritiated water vapor for the required time period ($\leq 60$ minutes), they are cumbersome to use because of their relatively large size and weight. Additionally, it is common for a user to experience leakage of excess water as well as to be exposed to toxic asbestos from the filter media.

Accordingly, it is an object of the present invention to provide a filter means which has an increased tritium removal efficiency and capacity, reducing the size of the canister necessary to achieve minimum protection times. It is a further object of the invention to provide a filter media which is nontoxic. Moreover, the filter means of the present invention is adaptable to existing respirator facepieces and does not require the user to add water prior to use. Consequently, the present invention overcomes many of the disadvantages of prior tritium filters.

SUMMARY OF THE INVENTION

Generally, the present invention provides a respirator filter for the removal of tritiated water which includes a housing in the form of a canister or cartridge having a gas inlet means and an outlet in communication with an air inlet port in the facepiece of a respirator. Interposed between and in communication with the inlet and outlets is a filter chamber for containing a particulate tritium filter material.

Disposed within the chamber is a particulate filter material having a high surface area. In the present invention silica gel and, in particular, activated carbon, are preferred. A particulate mesh size of from $6 \times 20$ for 500 cc to $12 \times 30$ for 110 cc with a preferred mesh size of $8 \times 16$. The preferred amount of filter particulate is at least 110 cc and about 500 cc.

The material is wetted with water to a moisture content of from about 20 to 40% by weight. Preferably, the moisture content is from about 25 to 38% by weight. In the case of silica gel, it is especially preferred to have a moisture of about 25% and, in the case of activated carbon it is desirable to have a moisture content of about 38%.

After addition of water to the filter material, the housing is sealed in a moisture tight container for storage until needed. These moisture laden filters can be stored up to two (2) years without loss of effectiveness or the development of mold, bacteria or yeast.

The invention has been found to provide effective filtration beyond the standard 60 minutes. Other advantages of the invention will become apparent from a perusal of the following detailed description of a presently preferred embodiment taken in connection with the accompanying drawings.

PRESENTLY PREFERRED EMBODIMENT

Figure 1:
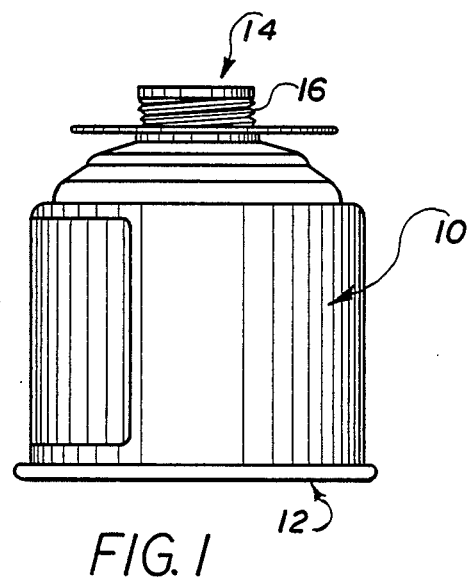
FIG. 1 is a side elevation of a filter housing or canister of the present invention.
Figure 3:
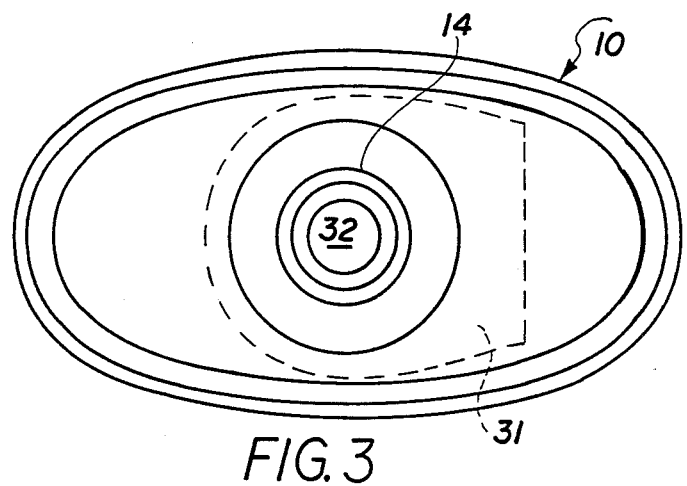
FIG. 3 is a top plane view.

With reference to FIG. 1, a housing 10 is shown. This housing may be in the form of a canister as shown in the drawings or in the form of cartridges. Preferably, housing 10 can take advantage of existing chemical canisters or cartridges used in respirators for removal of other hazardous gases and particulates.

Housing 10 includes an inlet 12 and outlet 14. Outlet 14 preferably is of a dimension and configuration, including external threads 16, to readily attach to a standard face piece used in prior art tritium respirators.

Figure 4:
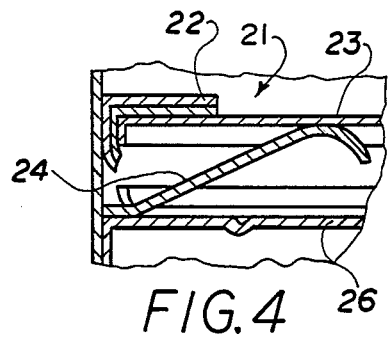
FIG. 4 is an exploded section of chamber retaining means shown in FIG. 2.
Figure 2:
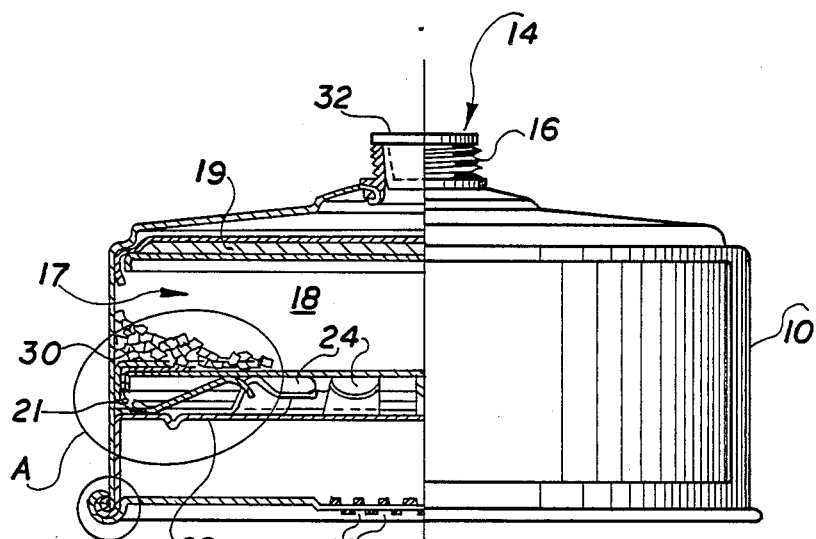
FIG. 2 is a front elevation in partial section of the filter housing shown in FIG. 1.

Interposed between inlet 12 and outlet 14 is filter chamber 17. Chamber 17 is made up of the inner housing wall 18, a top filter cover 19, preferably fiberglass mat, and bottom separator means 21. Separator means 21 is shown in FIG. 2 as exploded view A in FIG. 4. Separator 21 comprises an annular retainer ring 22 and filter plate 23, preferably (material), which permits the fluid to be purified to pass through. Separator means 21 is compressively maintained against retainer ring 22 by means of springs 24 positioned on annular flange 26.

Preferably filter chamber 17 has sufficient capacity to hold 110 to 500 cc of filter material 30. A bottom removable seal 31 is placed over inlets 12 and a cap 32 is inserted into outlet 14. Seal 31 and cap 32 are removed prior, to use. Housing 10 is preferably stored in a heat sealable aluminized foil (not shown) for later use.

In a preferred embodiment, the filter material is an activated carbon having a particulate size of $12 \times 30$ mesh. A preferred particulate distribution comprises:

| | |
|---|---|
| Larger than 12 mesh | 2% max. |
| Finer than 12 mesh, Larger than 16 mesh | 10 to 30% |
| Finer than 16 mesh, Larger than 20 mesh | 40 to 65% |
| Finer than 20 mesh, Larger than 30 mesh | 10 to 40% |
| Finer than 30 mesh | 2.5% max. |

A moisture content is from 35% to 40% by weight.

Tests were run using tritium filters of the present invention. The filter must remove 95% of the tritiated water entering canister 10 when exposed to $10^{-4}$ microcuries/cc for 60 minutes at a flow rate of 40 liters/minutes at 25° C. and 95% RH. The temperature at outlet 14 must be less than 41° C. when tested at 35° C. Results of these tests are shown in Tables I, II, III and IV below.

TABLE I

SERVICE LIFE OF SILICA GEL (6 × 16) RESPIRATOR CANISTER at 25 deg C.

| FILL | FILL VOLUME in cc | SERVICE LIFE in minutes to 5% leakage | RESISTANCE in mm H$_2$O at 85 lpm | PEAK TEMPERATURE IN DEG C. |
|---|---|---|---|---|
| 0% Moisture | 500 | 33.8 | | 60.5 |
| | 500 | 27.0 | | 57.9 |
| 5% Moisture | 500 | 44.7 | 23.0 | 47.0 |
| | 500 | 50.9 | 17.0 | 45.2 |
| 15% Moisture | 375 | 47.2 | 16.0 | 35.4 |
| | 375 | 48.7 | 17.0 | 35.7 |
| | 375 | 41.5 | 19.0 | 34.6 |
| | 500 | 75.3 | 16.0 | 21.1 |
| | 500 | 87.9 | 21.0 | 34.9 |
| | 500 | 74.5 | 18.0 | 35.9 |
| 25% Moisture | 500 | 200.0 | | 28.1 |
| 5% Moisture added 55 cc of water | 500 | 64.7 | | 40.0 |
| | 500 | 71.9 | | 40.8 |
| added 120 cc of water | 500 | 138.8 | | 30.2 |

TABLE II

SERVICE LIFE OF CARTRIDGES (2) 150 cc of activated carbon (12 × 20) with 38% moisture content

| TEST TEMPERATURE in deg C. | TEST RELATIVE HUMIDITY | SERVICE LIFE in minutes to 5% leakage | RESISTANCE in mm H$_2$O at 85 lpm | PEAK TEMPERATURE in deg C. |
|---|---|---|---|---|
| 25 | 95% | 55.9 | 12.5 | 25.8 |
| 25 | 95% | 54.4 | 11.5 | 25.8 |
| 25 | 95% | 44.5 | 11.5 | 26.1 |
| 35 | 0% | 70.3 | 10.5 | 27.8 |
| 35 | 0% | 54.5 | 11.5 | 24.1 |
| 35 | 0% | 50.1 | 11.5 | 22.3 |
| 35 | 25% | 84.0 | 12.0 | 30.8 |
| 35 | 25% | 65.1 | 11.0 | 31.0 |
| 35 | 25% | 70.7 | 11.0 | 30.9 |
| 35 | 55% | 67.2 | 11.0 | 32.6 |
| 35 | 55% | 62.5 | 11.5 | 33.9 |
| 35 | 55% | 61.6 | 11.5 | 33.5 |
| 35 | 75% | 57.5 | 11.0 | 34.6 |
| 35 | 75% | 50.9 | 11.5 | 35.3 |
| 35 | 75% | 52.1 | 12.0 | 34.4 |
| 35 | 95% | 45.3 | 11.5 | 34.3 |
| 35 | 95% | 68.3 | 11.0 | 33.4 |
| 35 | 95% | 44.8 | 11.5 | 33.1 |

TABLE 3

SERVICE LIFE OF CARTRIDGES (2) 150 cc of Silica Gel (6 × 16) with 25% moisture content

| TEST TEMPERATURE in deg C. | TEST RELATIVE HUMIDITY | SERVICE LIFE in minutes to 5% leakage | RESISTANCE in mm H$_2$O at 85 lpm | PEAK TEMPERATURE in deg C. |
|---|---|---|---|---|
| 25 | 95% | 67.1 | 17 | 27.4 |
| 25 | 95% | 65.2 | 16.5 | 27.1 |
| 25 | 95% | 59.0 | 14.5 | 27.6 |
| 35 | 55% | 65.3 | 15.5 | 33.3 |
| 35 | 55% | 60.4 | 16.0 | 34.1 |
| 35 | 55% | 71.8 | 17.0 | 35.8 |

TABLE IV

TEST CONDITIONS 40 Liters per minute 26 deg C. min. 90% RH

| CARTRIDGE | TEST NUMBER | TEST TIME minutes | % HDO REMOVED | % HTO REMOVED |
|---|---|---|---|---|
| Canister with 500 cc silica gel | 1 | 60 | 88.11 | 99.46 |
| | 2 | 60 | 91.44 | 99.49 |
| (6 × 16) with 5% moisture | 3 | 60 | 94.42 | 99.60 |
| | 4 | 60 | | 99.58 |

TABLE IV-continued

TEST CONDITIONS
40 Liters per minute
26 deg C.
min. 90% RH

| CARTRIDGE | TEST NUMBER | TEST TIME minutes | % HDO REMOVED | % HTO REMOVED |
|---|---|---|---|---|
|  |  | 96 |  | 92.46 |
| added 55 cc water | 5 | 60 | 96.92 |  |
|  | 6 | 60 | 98.47 | 99.84 |
|  |  | 120 |  | 94.33 |
| added 120 cc water | 7 | 60 | >99.8 | 99.98 |
|  |  | 120 | >99.8 | 99.24 |
|  |  | 144 | 91.69 | 95.76 |
| (2) CARTRIDGES | 1 | 50 | 87.90 |  |
| 105 cc silica gel |  | 60 |  | 97.44 |
| (6 × 16) with | 2 | 60 | 77.37 | 95.40 |
| 25% moisture | 3 | 50 | 84.21 |  |
|  | 4 | 50 | 88.55 |  |
| (2) CARTRIDGES | 1 | 50 | 66.32 |  |
| 105 cc carbon |  | 60 |  | 84.54 |
| (6 × 16) with | 2 | 40 | 74.14 |  |
| 37% added water |  | 60 |  | 90.05 |
|  | 3 | 40 | 74.32 |  |
| CARTRIDGE | 1 | 60 | 93.74 | 98.07 |
| 150 cc carbon |  | 72 | 85.32 | 81.92 |
| (12 × 20) with | 2 | 60 | 92.44 | 95.91 |
| 38% moisture | 3 | 60 | 81.00 | 95.04 |
|  | 4 | 60 |  | 95.64 |

While a presently preferred embodiment of the invention has been shown and described in detail, it may be otherwise embodied within the scope of the appended claims.

What is claimed is:

1. Filter means for removal of tritiated water comprising:
   A. a housing having a fluid inlet and outlet and a filter chamber interposed between and in communication with said inlet and outlet, said chamber being adapted to contain a tritium filter media; and
   B. a tritium filter media selected from the group consisting of particulate activated carbon and particulate silica gel, said media having a moisture content of from about 25% to 40% by weight of said media and a particulate distribution size range of from 6×20 to 12×30.

2. A filter means set forth in claim 1, wherein said tritium filter medium is activated carbon having a moisture content of from 35 to 40% by weight and a particulate size substantially with a 12×30 mesh distribution.

3. A filter means as set forth in claim 1, wherein aids tritium filter media is silica gel having a moisture content of about 25% and a particulate size substantially within 6×20 mesh distribution.

* * * * *

UNITED STATES PATENT AND TRADEMARK OFFICE
CERTIFICATE OF CORRECTION

PATENT NO. : 4,964,900

DATED : October 23, 1990

INVENTOR(S) : Ronald E. Thompson, William P. King

It is certified that error appears in the above—identified patent and that said Letters Patent is hereby corrected as shown below:

At Column 1, Line 23, ("$\leq$" 60 minutes) should be (-- $\geq$ -- 60 minutes).

Signed and Sealed this

Fifth Day of May, 1992

*Attest:*

DOUGLAS B. COMER

*Attesting Officer*  Acting Commissioner of Patents and Trademarks